United States Patent
Whitesides et al.

(10) Patent No.: US 9,170,467 B2
(45) Date of Patent: Oct. 27, 2015

(54) COLOR ELECTRO-OPTIC DISPLAYS, AND PROCESSES FOR THE PRODUCTION THEREOF

(75) Inventors: Thomas H. Whitesides, Victoria (CA); Andrew Y. Oleson, Highland Park, NJ (US); Guy M. Danner, Somerville, MA (US); Richard J. Paolini, Jr., Framingham, MA (US); Charles Howie Honeyman, Toronto (CA)

(73) Assignee: E Ink Corporation, Billerica, MA (US)

( * ) Notice: Subject to any disclaimer, the term of this patent is extended or adjusted under 35 U.S.C. 154(b) by 0 days.

(21) Appl. No.: 13/428,665

(22) Filed: Mar. 23, 2012

(65) Prior Publication Data

US 2012/0182597 A1 Jul. 19, 2012

Related U.S. Application Data

(60) Division of application No. 11/851,568, filed on Sep. 7, 2007, now abandoned, which is a continuation-in-part of application No. 11/550,114, filed on Oct. 17, 2006, now Pat. No. 7,839,564.

(60) Provisional application No. 60/825,933, filed on Sep. 18, 2006, provisional application No. 60/596,743, filed on Oct. 18, 2005, provisional application No. 60/596,799, filed on Oct. 21, 2005.

(51) Int. Cl.
| | |
|---|---|
| *G02B 26/00* | (2006.01) |
| *G02F 1/29* | (2006.01) |
| *G02F 1/167* | (2006.01) |
| *G02F 1/1335* | (2006.01) |

(52) U.S. Cl.
CPC .......... *G02F 1/167* (2013.01); *G02F 1/133516* (2013.01); *G02F 2001/1672* (2013.01); *Y10T 29/49002* (2015.01); *Y10T 428/24802* (2015.01)

(58) Field of Classification Search
USPC ......... 359/237, 242, 290–292, 295, 296, 298, 359/245, 246, 251–254, 265–267, 273, 321, 359/322, 315–319
See application file for complete search history.

(56) References Cited

U.S. PATENT DOCUMENTS

| | | |
|---|---|---|
| 3,391,014 A | 7/1968 | Fauser |
| 3,668,106 A | 6/1972 | Ota |

(Continued)

FOREIGN PATENT DOCUMENTS

| | | |
|---|---|---|
| EP | 1 099 207 B1 | 3/2002 |
| EP | 1 145 072 B1 | 5/2003 |

(Continued)

OTHER PUBLICATIONS

Amundson, K., "Electrophoretic Imaging Films for Electronic Paper Displays" in Crawford. G. ed. Flexible Rat Panel Displays, John Wiley & Sons, Ltd., Hoboken, NJ: 2005.

(Continued)

*Primary Examiner* — Stephone B Allen
*Assistant Examiner* — Brandi Thomas
(74) *Attorney, Agent, or Firm* — David J. Cole

(57) ABSTRACT

A color filter array is provided in an electro-optic display by ink jet printing a plurality of colored areas (22R, 22G, 22B) on one surface of a layer of electro-optic material (12), an adhesive layer or a protective layer. Alternatively, the ink jet printing may be effected on the same layers in various sub-assemblies used to produce electro-optic displays.

12 Claims, 2 Drawing Sheets

(56) References Cited

U.S. PATENT DOCUMENTS

| | | |
|---|---|---|
| 3,756,693 A | 9/1973 | Ota |
| 3,767,392 A | 10/1973 | Ota |
| 3,772,013 A | 11/1973 | Wells |
| 3,792,308 A | 2/1974 | Ota |
| 3,870,517 A | 3/1975 | Ota et al. |
| 3,892,568 A | 7/1975 | Ota |
| 3,959,906 A | 6/1976 | Norris, Jr. et al. |
| 4,093,534 A | 6/1978 | Carter et al. |
| 4,160,257 A | 7/1979 | Carrish |
| 4,272,596 A | 6/1981 | Harbour et al. |
| 4,418,346 A | 11/1983 | Batchelder |
| 4,522,472 A | 6/1985 | Liebert et al. |
| 4,550,982 A | 11/1985 | Hirai |
| 4,602,263 A | 7/1986 | Borror et al. |
| 4,655,897 A | 4/1987 | DiSanto et al. |
| 4,681,403 A | 7/1987 | Te Velde et al. |
| 4,703,573 A | 11/1987 | Montgomery et al. |
| 4,742,345 A | 5/1988 | DiSanto et al. |
| 4,746,917 A | 5/1988 | DiSanto et al. |
| 4,902,108 A | 2/1990 | Byker |
| 5,032,851 A * | 7/1991 | Yoshimura .................... 347/15 |
| 5,250,938 A | 10/1993 | DiSanto et al. |
| 5,276,438 A | 1/1994 | DiSanto et al. |
| 5,288,433 A | 2/1994 | Stevens |
| 5,293,528 A | 3/1994 | DiSanto et al. |
| 5,378,404 A | 1/1995 | Han et al. |
| 5,402,145 A | 3/1995 | DiSanto et al. |
| 5,412,398 A | 5/1995 | DiSanto et al. |
| 5,467,107 A | 11/1995 | DiSanto et al. |
| 5,484,292 A | 1/1996 | McTaggart |
| 5,485,176 A | 1/1996 | Ohara et al. |
| 5,548,282 A | 8/1996 | Escritt et al. |
| 5,561,443 A | 10/1996 | DiSanto et al. |
| 5,745,094 A | 4/1998 | Gordon, II et al. |
| 5,760,761 A | 6/1998 | Sheridon |
| 5,777,782 A | 7/1998 | Sheridon |
| 5,800,950 A | 9/1998 | Hirao et al. |
| 5,808,783 A | 9/1998 | Crowley |
| 5,825,526 A | 10/1998 | Bommarito et al. |
| 5,872,552 A | 2/1999 | Gordon, II et al. |
| 5,930,026 A | 7/1999 | Jacobson et al. |
| 5,961,804 A | 10/1999 | Jacobson et al. |
| 6,017,584 A | 1/2000 | Albert et al. |
| 6,025,896 A | 2/2000 | Hattori et al. |
| 6,054,071 A | 4/2000 | Mikkelsen, Jr. |
| 6,055,091 A | 4/2000 | Sheridon et al. |
| 6,067,185 A | 5/2000 | Albert et al. |
| 6,097,531 A | 8/2000 | Sheridon |
| 6,105,290 A | 8/2000 | Coates et al. |
| 6,117,368 A | 9/2000 | Hou |
| 6,118,426 A | 9/2000 | Albert et al. |
| 6,120,588 A | 9/2000 | Jacobson |
| 6,120,839 A | 9/2000 | Comiskey et al. |
| 6,124,851 A | 9/2000 | Jacobson |
| 6,128,124 A | 10/2000 | Silverman |
| 6,130,773 A | 10/2000 | Jacobson et al. |
| 6,130,774 A | 10/2000 | Albert et al. |
| 6,137,467 A | 10/2000 | Sheridon et al. |
| 6,144,361 A | 11/2000 | Gordon, II et al. |
| 6,147,791 A | 11/2000 | Sheridon |
| 6,151,153 A | 11/2000 | Bryan |
| 6,172,798 B1 | 1/2001 | Albert et al. |
| 6,177,921 B1 | 1/2001 | Comiskey et al. |
| 6,184,856 B1 | 2/2001 | Gordon, II et al. |
| 6,204,953 B1 | 3/2001 | Zieba et al. |
| 6,225,971 B1 | 5/2001 | Gordon, II et al. |
| 6,232,950 B1 | 5/2001 | Albert et al. |
| 6,241,921 B1 | 6/2001 | Jacobson et al. |
| 6,249,271 B1 | 6/2001 | Albert et al. |
| 6,252,564 B1 | 6/2001 | Albert et al. |
| 6,262,706 B1 | 7/2001 | Albert et al. |
| 6,262,833 B1 | 7/2001 | Loxley et al. |
| 6,271,823 B1 | 8/2001 | Gordon, II et al. |
| 6,300,932 B1 | 10/2001 | Albert |
| 6,301,038 B1 | 10/2001 | Fitzmaurice et al. |
| 6,312,304 B1 | 11/2001 | Duthaler et al. |
| 6,312,971 B1 | 11/2001 | Amundson et al. |
| 6,323,989 B1 | 11/2001 | Jacobson et al. |
| 6,327,072 B1 | 12/2001 | Comiskey et al. |
| 6,330,054 B1 | 12/2001 | Ikami |
| 6,337,761 B1 | 1/2002 | Rogers et al. |
| 6,376,828 B1 | 4/2002 | Comiskey |
| 6,377,387 B1 | 4/2002 | Duthaler et al. |
| 6,392,785 B1 | 5/2002 | Albert et al. |
| 6,392,786 B1 | 5/2002 | Albert |
| 6,400,492 B1 | 6/2002 | Morita et al. |
| 6,413,790 B1 | 7/2002 | Duthaler et al. |
| 6,422,687 B1 | 7/2002 | Jacobson |
| 6,445,374 B2 | 9/2002 | Albert et al. |
| 6,445,489 B1 | 9/2002 | Jacobson et al. |
| 6,459,418 B1 | 10/2002 | Comiskey et al. |
| 6,473,072 B1 | 10/2002 | Comiskey et al. |
| 6,480,182 B2 | 11/2002 | Turner et al. |
| 6,498,114 B1 | 12/2002 | Amundson et al. |
| 6,504,524 B1 | 1/2003 | Gates et al. |
| 6,506,438 B2 | 1/2003 | Duthaler et al. |
| 6,512,354 B2 | 1/2003 | Jacobson et al. |
| 6,515,649 B1 | 2/2003 | Albert et al. |
| 6,515,790 B2 | 2/2003 | Miyamoto et al. |
| 6,518,949 B2 | 2/2003 | Drzaic |
| 6,521,489 B2 | 2/2003 | Duthaler et al. |
| 6,531,997 B1 | 3/2003 | Gates et al. |
| 6,535,197 B1 | 3/2003 | Comiskey et al. |
| 6,538,801 B2 | 3/2003 | Jacobson et al. |
| 6,545,291 B1 | 4/2003 | Amundson et al. |
| 6,580,545 B2 | 6/2003 | Morrison et al. |
| 6,639,578 B1 | 10/2003 | Comiskey et al. |
| 6,652,075 B2 | 11/2003 | Jacobson |
| 6,657,772 B2 | 12/2003 | Loxley |
| 6,661,563 B2 | 12/2003 | Hayahi et al. |
| 6,664,944 B1 | 12/2003 | Albert et al. |
| 6,671,030 B2 | 12/2003 | Gyoda |
| D485,294 S | 1/2004 | Albert |
| 6,672,921 B1 | 1/2004 | Liang et al. |
| 6,680,517 B2 | 1/2004 | Namba |
| 6,680,725 B1 | 1/2004 | Jacobson |
| 6,683,333 B2 | 1/2004 | Kazlas et al. |
| 6,693,620 B1 | 2/2004 | Herb et al. |
| 6,704,133 B2 | 3/2004 | Gates et al. |
| 6,710,540 B1 | 3/2004 | Albert et al. |
| 6,721,083 B2 | 4/2004 | Jacobson et al. |
| 6,721,084 B2 | 4/2004 | Kawai |
| 6,723,392 B1 | 4/2004 | Jinnai et al. |
| 6,724,519 B1 | 4/2004 | Comiskey et al. |
| 6,727,881 B1 | 4/2004 | Albert et al. |
| 6,731,367 B1 | 5/2004 | Saitoh |
| 6,738,050 B2 | 5/2004 | Comiskey et al. |
| 6,750,473 B2 | 6/2004 | Amundson et al. |
| 6,750,844 B2 | 6/2004 | Nakanishi |
| 6,753,999 B2 | 6/2004 | Zehner et al. |
| 6,788,449 B2 | 9/2004 | Liang et al. |
| 6,816,147 B2 | 11/2004 | Albert |
| 6,819,471 B2 | 11/2004 | Amundson et al. |
| 6,822,782 B2 | 11/2004 | Honeyman et al. |
| 6,825,068 B2 | 11/2004 | Denis et al. |
| 6,825,829 B1 | 11/2004 | Albert et al. |
| 6,825,970 B2 | 11/2004 | Goenaga et al. |
| 6,831,769 B2 * | 12/2004 | Holman et al. ............... 359/296 |
| 6,839,158 B2 | 1/2005 | Albert et al. |
| 6,842,167 B2 | 1/2005 | Albert et al. |
| 6,842,279 B2 | 1/2005 | Amundson |
| 6,842,657 B1 | 1/2005 | Drzaic et al. |
| 6,845,184 B1 | 1/2005 | Yoshimura et al. |
| 6,859,247 B2 | 2/2005 | Murade et al. |
| 6,864,875 B2 | 3/2005 | Drzaic et al. |
| 6,865,010 B2 | 3/2005 | Duthaler et al. |
| 6,866,760 B2 | 3/2005 | Paolini, Jr. et al. |
| 6,870,657 B1 | 3/2005 | Fitzmaurice et al. |
| 6,870,661 B2 | 3/2005 | Pullen et al. |
| 6,891,672 B2 | 5/2005 | Whitehead et al. |
| 6,900,851 B2 | 5/2005 | Morrison et al. |
| 6,922,276 B2 | 7/2005 | Zhang et al. |
| 6,950,220 B2 | 9/2005 | Abramson et al. |
| 6,958,848 B2 | 10/2005 | Cao et al. |

(56) References Cited

U.S. PATENT DOCUMENTS

| | | | |
|---|---|---|---|
| 6,967,640 B2 | 11/2005 | Albert et al. | |
| 6,980,196 B1 | 12/2005 | Turner et al. | |
| 6,982,178 B2 | 1/2006 | LeCain et al. | |
| 6,987,603 B2 | 1/2006 | Paolini, Jr. et al. | |
| 6,995,550 B2 | 2/2006 | Jacobson et al. | |
| 7,002,728 B2 | 2/2006 | Pullen et al. | |
| 7,012,583 B2 | 3/2006 | Toro-Lira et al. | |
| 7,012,600 B2 | 3/2006 | Zehner et al. | |
| 7,012,735 B2 | 3/2006 | Honeyman et al. | |
| 7,023,420 B2 | 4/2006 | Comiskey et al. | |
| 7,030,412 B1 | 4/2006 | Drzaic et al. | |
| 7,030,854 B2 | 4/2006 | Baucom et al. | |
| 7,034,783 B2 | 4/2006 | Gates et al. | |
| 7,038,655 B2 | 5/2006 | Herb et al. | |
| 7,052,355 B2 * | 5/2006 | Liu et al. | 445/24 |
| 7,061,663 B2 | 6/2006 | Cao et al. | |
| 7,071,913 B2 | 7/2006 | Albert et al. | |
| 7,075,502 B1 | 7/2006 | Drzaic et al. | |
| 7,075,703 B2 | 7/2006 | O'Neil et al. | |
| 7,079,305 B2 | 7/2006 | Paolini, Jr. et al. | |
| 7,106,296 B1 | 9/2006 | Jacobson | |
| 7,109,968 B2 | 9/2006 | Albert et al. | |
| 7,110,163 B2 | 9/2006 | Webber et al. | |
| 7,110,164 B2 | 9/2006 | Paolini, Jr. et al. | |
| 7,116,318 B2 | 10/2006 | Amundson et al. | |
| 7,116,466 B2 | 10/2006 | Whitesides et al. | |
| 7,119,772 B2 | 10/2006 | Amundson et al. | |
| 7,148,128 B2 | 12/2006 | Jacobson | |
| 7,167,155 B1 | 1/2007 | Albert et al. | |
| 7,170,670 B2 | 1/2007 | Webber | |
| 7,173,752 B2 | 2/2007 | Doshi et al. | |
| 7,176,880 B2 | 2/2007 | Amundson et al. | |
| 7,180,649 B2 | 2/2007 | Morrison et al. | |
| 7,190,008 B2 | 3/2007 | Amundson et al. | |
| 7,193,625 B2 | 3/2007 | Danner et al. | |
| 7,202,847 B2 | 4/2007 | Gates | |
| 7,202,991 B2 | 4/2007 | Zhang et al. | |
| 7,206,119 B2 | 4/2007 | Honeyman et al. | |
| 7,215,347 B2 | 5/2007 | Phan | |
| 7,223,672 B2 | 5/2007 | Kazlas et al. | |
| 7,230,750 B2 | 6/2007 | Whitesides et al. | |
| 7,230,751 B2 | 6/2007 | Whitesides et al. | |
| 7,236,290 B1 | 6/2007 | Zhang et al. | |
| 7,236,291 B2 | 6/2007 | Kaga et al. | |
| 7,236,292 B2 | 6/2007 | LeCain et al. | |
| 7,242,513 B2 | 7/2007 | Albert et al. | |
| 7,247,379 B2 | 7/2007 | Pullen et al. | |
| 7,256,766 B2 | 8/2007 | Albert et al. | |
| 7,259,744 B2 | 8/2007 | Arango et al. | |
| 7,280,094 B2 | 10/2007 | Albert | |
| 7,304,634 B2 | 12/2007 | Albert et al. | |
| 7,304,787 B2 | 12/2007 | Whitesides et al. | |
| 7,312,784 B2 | 12/2007 | Baucom et al. | |
| 7,312,794 B2 | 12/2007 | Zehner et al. | |
| 7,312,916 B2 | 12/2007 | Pullen et al. | |
| 7,321,459 B2 | 1/2008 | Masuda et al. | |
| 7,327,511 B2 | 2/2008 | Whitesides et al. | |
| 7,339,715 B2 | 3/2008 | Webber et al. | |
| 7,352,353 B2 | 4/2008 | Albert et al. | |
| 7,365,394 B2 | 4/2008 | Denis et al. | |
| 7,365,733 B2 | 4/2008 | Duthaler et al. | |
| 7,382,363 B2 | 6/2008 | Albert et al. | |
| 7,388,572 B2 | 6/2008 | Duthaler et al. | |
| 7,391,555 B2 | 6/2008 | Albert et al. | |
| 7,411,719 B2 | 8/2008 | Paolini, Jr. et al. | |
| 7,420,549 B2 | 9/2008 | Jacobson et al. | |
| 7,442,587 B2 | 10/2008 | Amundson et al. | |
| 7,453,445 B2 | 11/2008 | Amundson | |
| 2001/0055000 A1 | 12/2001 | Kanae et al. | |
| 2002/0060321 A1 | 5/2002 | Kazlas et al. | |
| 2002/0090980 A1 | 7/2002 | Wilcox et al. | |
| 2002/0106874 A1 | 8/2002 | Iwane et al. | |
| 2003/0102858 A1 | 6/2003 | Jacobson et al. | |
| 2003/0179436 A1 | 9/2003 | Liang et al. | |
| 2004/0105036 A1 | 6/2004 | Danner et al. | |
| 2004/0112750 A1 | 6/2004 | Jacobson et al. | |
| 2004/0119681 A1 | 6/2004 | Albert et al. | |
| 2004/0155857 A1 | 8/2004 | Duthaler et al. | |
| 2004/0163570 A1 * | 8/2004 | Vanmaele et al. | 106/31.13 |
| 2004/0180476 A1 | 9/2004 | Kazlas et al. | |
| 2004/0190114 A1 | 9/2004 | Jacobson et al. | |
| 2004/0263947 A1 | 12/2004 | Drzaic et al. | |
| 2005/0001810 A1 | 1/2005 | Yakushiji et al. | |
| 2005/0007336 A1 | 1/2005 | Albert et al. | |
| 2005/0012980 A1 | 1/2005 | Wilcox et al. | |
| 2005/0018273 A1 | 1/2005 | Honeyman et al. | |
| 2005/0024353 A1 | 2/2005 | Amundson et al. | |
| 2005/0062714 A1 | 3/2005 | Zehner et al. | |
| 2005/0122284 A1 | 6/2005 | Gates et al. | |
| 2005/0122306 A1 | 6/2005 | Wilcox et al. | |
| 2005/0122563 A1 | 6/2005 | Honeyman et al. | |
| 2005/0124751 A1 | 6/2005 | Klingenberg et al. | |
| 2005/0152018 A1 | 7/2005 | Abramson et al. | |
| 2005/0156340 A1 | 7/2005 | Valianatos et al. | |
| 2005/0179642 A1 | 8/2005 | Wilcox et al. | |
| 2005/0212747 A1 | 9/2005 | Amundson | |
| 2005/0253777 A1 | 11/2005 | Zehner et al. | |
| 2005/0259068 A1 | 11/2005 | Nihei et al. | |
| 2005/0270261 A1 | 12/2005 | Danner et al. | |
| 2005/0280626 A1 | 12/2005 | Amundson et al. | |
| 2006/0038772 A1 | 2/2006 | Amundson et al. | |
| 2006/0087479 A1 | 4/2006 | Sakurai et al. | |
| 2006/0087489 A1 | 4/2006 | Sakurai et al. | |
| 2006/0087718 A1 | 4/2006 | Takagi et al. | |
| 2006/0139308 A1 | 6/2006 | Jacobson et al. | |
| 2006/0139310 A1 | 6/2006 | Zehner et al. | |
| 2006/0139311 A1 | 6/2006 | Zehner et al. | |
| 2006/0176267 A1 | 8/2006 | Honeyman et al. | |
| 2006/0181492 A1 | 8/2006 | Gates et al. | |
| 2006/0181504 A1 | 8/2006 | Kawai | |
| 2006/0194619 A1 | 8/2006 | Wilcox et al. | |
| 2006/0197737 A1 | 9/2006 | Baucom et al. | |
| 2006/0197738 A1 | 9/2006 | Kawai | |
| 2006/0202949 A1 | 9/2006 | Danner et al. | |
| 2006/0209008 A1 | 9/2006 | Nihei et al. | |
| 2006/0214906 A1 | 9/2006 | Kobayashi et al. | |
| 2006/0231401 A1 | 10/2006 | Sakurai et al. | |
| 2006/0232531 A1 | 10/2006 | Amundson et al. | |
| 2006/0238488 A1 | 10/2006 | Nihei et al. | |
| 2006/0263927 A1 | 11/2006 | Sakurai et al. | |
| 2006/0279527 A1 | 12/2006 | Zehner et al. | |
| 2006/0291034 A1 | 12/2006 | Patry et al. | |
| 2007/0013683 A1 | 1/2007 | Zhou et al. | |
| 2007/0035532 A1 | 2/2007 | Amundson et al. | |
| 2007/0035808 A1 | 2/2007 | Amundson et al. | |
| 2007/0103427 A1 | 5/2007 | Zhou et al. | |
| 2008/0074730 A1 | 3/2008 | Cao et al. | |

FOREIGN PATENT DOCUMENTS

| | | | |
|---|---|---|---|
| JP | 62-269124 A | 11/1987 | |
| JP | 64-086116 | 3/1989 | |
| JP | 01-267525 A | 10/1989 | |
| JP | 02-284125 A | 11/1990 | |
| JP | 03-168613 | 7/1991 | |
| JP | 08-278491 | 10/1996 | |
| JP | 10-149118 A | 6/1998 | |
| JP | 2001-066408 | 3/2001 | |
| JP | 2002-098945 | 4/2002 | |
| JP | 2002-258329 | 9/2002 | |
| JP | 2003-321634 | * 11/2003 | G02B 26/00 |
| JP | 2006-002128 | 1/2006 | |
| WO | WO 82/02961 | 9/1982 | |
| WO | WO 00/36560 | 6/2000 | |
| WO | WO 00/38000 | 6/2000 | |
| WO | WO 00/67110 | 11/2000 | |
| WO | WO 01/07961 | 2/2001 | |
| WO | WO 01/92359 | 12/2001 | |
| WO | WO 2004/079442 | 9/2004 | |

OTHER PUBLICATIONS

Amundson, K., et al., "Flexible, Active-Matrix Display Constructed Using a Microencapsulatcd Electrophoretic Material and an

(56) References Cited

OTHER PUBLICATIONS

Organic-Semiconductor-Based Backplane", SID 01 Digest, 160 (Jun. 2001).
Au, J. et al., "Ultra-Thin 3.1-in. Active-Matrix Electronic Ink Display for Mobile Devices", IDW'02, 223 (2002).
Bach, U., et al., "Nanomaterials-Based Electrochromics for Paper-Quality Displays", Adv. Mater, 14(11), 845 (2002).
Bouchard, A. et al., "High-Resolution Microencapsulated Electrophoretic Display on Silicon", SID 04 Digest, 651 (2004).
Caillot, E. et al. "Active Matrix Electrophoretic Information Display for High Performance Mobile Devices", IDMC Proceedings (2003).
Chen, Y., et al., "A Conformable Electronic Ink Display using a Foil-Based a-Si TFT Array", SID 01 Digest, 157 (Jun. 2001).
Comiskey, B., et al., "An electrophoretic ink for all-printed reflective electronic displays", Nature, 394, 253 (1998).
Comiskey, B., et al., "Electrophoretic ink: A Printable Display Material", SID 97 Digest (1997), p. 75.
Croucher, M.D., et al., "Electrophoretic Display: Materials as Related to Performance", Photog. Sci. Eng., 25, 80 (1981).
Dalisa, A.L., "Electrophoretic Display Technology", IEEE Trans. Electron Dev., ED-24, 827 (1997).
Danner, G.M. et al., "Reliability Performance for Microencapsulated Electrophoretic Displays with Simulated Active Matrix Drive", SID 03 Digest, 573 (2003).
Drzaic, P., et al., "A Printed and Rollable Bistable Electronic Display", SID 98 Digest (1998), p. 1131.
Duthaier, G., et al., "Active-Matrix Color Displays Using Electrophoretic Ink and Color Filters", SID 02 Digest, 1374 (2002).
Gates, H. et al., "A5 Sized Electronic Paper Display for Document Viewing", SID 05 Digest, (2005).
Gutcho, M.H., Microcapsules and Microencapsulation Techniques, Noyes Data Corp., Park Ridge NJ, (1976).
Hayes, R.A et al., "Video-Speed Electronic Paper Based on Electrowetting", Nature, vol. 425, Sep. 25, pp. 383-385 (2003).
Henzen, A. et al., "An Electronic Ink Low Latency Drawing Tablet", SID 04 Digest, 1070 (2004).
Henzen, A. et al., "Development of Active Matrix Electronic Ink Displays for Handheld Devices", SID 03 Digest, 176, (2003).
Henzen, A. et al., "Development of Active Matrix Electronic Ink Displays for Smart Handheld Applications", IDW'02, 227 (2002).
Jacobson, J., et al., "The last book", IBM Systems J., 36, 457 (1997).
Jo, G-R, et al., "Toner Display Based on Particle Movements", Chem. Mater, 14, 664 (2002).
Johnson, M, et al., "High Quality Images on Electronic Paper Displays", SID 05 Digest, 1666 (2005).
Kazlas, P. et al., "Card-size Active-matrix Electronic Ink Display", Eurodisplay 2002, 259 (2002).
Kazlas, P., et al., "12.1" SVGA Microencapsulated Electrophoretic Active Matrix Display for Information Applicances", SID 01 Digest, 152 (Jun. 2001).
Kitarnura, T., et al., "Electrical toner movement for electronic paper-like display", Asia Display/IDW '01, p. 1517, Paper HCS1-1 (2001).
O'Regan, B. et al., "A Low Cost, High-efficiency Solar Cell Based on Dye-sensitized colloidal TiO2 Films", Nature, vol. 353, Oct. 24, 1991, 773-740.
Ota, I, et al., "Deveopments in Electrophoretic Displays", Proceedings of the SID, 18, 243 (1977).
Pitt, M.G., et al., "Power Consumption of Microencapsulated Electrophoretic Displays for Smart Handheld Applications", SID 02 Digest, 1378 (2002).
Shiwa, S., et al., "Electrophoretic Display Method Using Ionographic Technology," SID 88 Digest (1988), p. 61.
Webber, R., "Image Stability in Active-Matrix Microencapsulated Electrophoretic Displays", SID 02 Digest, 126 (2002).
Whitesides, T. et al., "Towards Video-rate Microencapsulated Dual-Particle Electrophoretic Displays", SID 04 Digest, 133 (2004).
Wood, D., "An Electrochromic Renaissance?" Information Display, 18(3), (Mar. 24, 2002).
Yamaguchi, Y., et al., "Toner display using insulative particles charged triboelectrically", Asia Display/IDW '01, p. 1729, Paper AMD4-4 (2001).
Zehner, R. et al., "Drive Waveforms for Active Matrix Electrophoretic Displays", SID 03 Digest, 842 (2003).

* cited by examiner

| Y | Y | Y | Y | Y | Y | Y | Y | Y | Y | Y | Y |
|---|---|---|---|---|---|---|---|---|---|---|---|
| Y | Y | Y | Y | Y | Y | Y | Y | Y | Y | Y | Y |
| Y | Y | Y | Y | Y | Y | Y | Y | Y | Y | Y | Y |
| Y | Y | Y | Y | Y | Y | Y | Y | Y | Y | Y | Y |
| C | C | C | C | C | C | M | M | M | M | M | M |
| C | C | C | C | C | C | M | M | M | M | M | M |
| C | C | C | C | C | C | M | M | M | M | M | M |
| C | C | C | C | C | C | M | M | M | M | M | M |
| C | C | C | C | C | C | M | M | M | M | M | M |
| C | C | C | C | C | C | M | M | M | M | M | M |

COLOR ELECTRO-OPTIC DISPLAYS, AND PROCESSES FOR THE PRODUCTION THEREOF

REFERENCE TO RELATED APPLICATIONS

This application is a division of application Ser. No. 11/851,568, filed Sep. 7, 2007 (Publication No. 2008/0043318), which claims benefit of Application Ser. No. 60/825,933, filed Sep. 18, 2006.

The aforementioned application Ser. No. 11/851,568 is also a continuation-in-part of application Ser. No. 11/550,114, filed Oct. 17, 2006 (Publication No. 2007/0109219, now U.S. Pat. No. 7,839,564, issued Dec. 23, 2010), which itself claims benefit of Application Ser. No. 60/596,743, filed Oct. 18, 2005, and of Application Ser. No. 60/596,799, filed Oct. 21, 2005.

This application is also related to:
(a) application Ser. No. 10/249,957, filed May 22, 2003 (now U.S. Pat. No. 6,982,178), which claims benefit of Application Ser. No. 60/319,300, filed Jun. 10, 2002, and Application Ser. No. 60/320,186, filed May 12, 2003;
(b) application Ser. No. 10/907,065, filed Mar. 18, 2005 (now U.S. Pat. No. 7,236,292), which is a divisional of the aforementioned application Ser. No. 10/249,957;
(c) copending application Ser. No. 11/747,546, filed May 11, 2007 (now U.S. Pat. No. 7,443,571), which is a continuation of the aforementioned application Ser. No. 10/907,065;
(d) copending application Ser. No. 10/605,024, filed Sep. 2, 2003 (Publication No. 2004/0155857, now U.S. Pat. No. 7,561,324);
(e) copending application Ser. No. 10/904,063, filed Oct. 21, 2004 (now U.S. Pat. No. 7,110,164), which is a continuation-in-part of the aforementioned application Ser. No. 10/605,024.
(f) application Ser. No. 10/145,861, filed May 13, 2002 (now U.S. Pat. No. 6,864,875), which is a continuation of application Ser. No. 09/436,303, filed Nov. 8, 1999 (now abandoned), which is itself a divisional of copending application Ser. No. 09/289,507, filed Apr. 9, 1999 (now U.S. Pat. No. 7,075,502).

The entire contents of these copending applications, and of all other U.S. patents and published and copending applications mentioned below, are herein incorporated by reference.

BACKGROUND OF INVENTION

The present invention relates to color electro-optic displays and processes for the production thereof. This invention relates to such displays and processes containing an electro-optic medium which is a solid (such displays may hereinafter for convenience be referred to as "solid electro-optic displays"), in the sense that the electro-optic medium has solid external surfaces, although the medium may, and often does, have internal liquid- or gas-filled spaces, and to methods for assembling displays using such an electro-optic medium. Thus, the term "solid electro-optic displays" includes encapsulated electrophoretic displays and other types of displays discussed below.

The term "electro-optic", as applied to a material or a display, is used herein in its conventional meaning in the imaging art to refer to a material having first and second display states differing in at least one optical property, the material being changed from its first to its second display state by application of an electric field to the material. Although the optical property is typically color perceptible to the human eye, it may be another optical property, such as optical transmission, reflectance, luminescence or, in the case of displays intended for machine reading, pseudo-color in the sense of a change in reflectance of electromagnetic wavelengths outside the visible range.

The terms "bistable" and "bistability" are used herein in their conventional meaning in the art to refer to displays comprising display elements having first and second display states differing in at least one optical property, and such that after any given element has been driven, by means of an addressing pulse of finite duration, to assume either its first or second display state, after the addressing pulse has terminated, that state will persist for at least several times, for example at least four times, the minimum duration of the addressing pulse required to change the state of the display element. It is shown in U.S. Pat. No. 7,170,670 that some particle-based electrophoretic displays capable of gray scale are stable not only in their extreme black and white states but also in their intermediate gray states, and the same is true of some other types of electro-optic displays. This type of display is properly called "multi-stable" rather than bistable, although for convenience the term "bistable" may be used herein to cover both bistable and multi-stable displays.

Several types of electro-optic displays are known. One type of electro-optic display is a rotating bichromal member type as described, for example, in U.S. Pat. Nos. 5,808,783; 5,777,782; 5,760,761; 6,054,071 6,055,091; 6,097,531; 6,128,124; 6,137,467; and 6,147,791 (although this type of display is often referred to as a "rotating bichromal ball" display, the term "rotating bichromal member" is preferred as more accurate since in some of the patents mentioned above the rotating members are not spherical). Such a display uses a large number of small bodies (typically spherical or cylindrical) which have two or more sections with differing optical characteristics, and an internal dipole. These bodies are suspended within liquid-filled vacuoles within a matrix, the vacuoles being filled with liquid so that the bodies are free to rotate. The appearance of the display is changed by applying an electric field thereto, thus rotating the bodies to various positions and varying which of the sections of the bodies is seen through a viewing surface. This type of electro-optic medium is typically bistable.

Another type of electro-optic display is an electro-wetting display developed by Philips and described in Hayes, R. A., et al., "Video-Speed Electronic Paper Based on Electrowetting", Nature, 425, 383-385 (2003). It is shown in copending application Ser. No. 10/711,802, filed Oct. 6, 2004 (Publication No. 2005/0151709), that such electro-wetting displays can be made bistable.

Another type of electro-optic display, which has been the subject of intense research and development for a number of years, is the particle-based electrophoretic display, in which a plurality of charged particles move through a fluid under the influence of an electric field. Electrophoretic displays can have attributes of good brightness and contrast, wide viewing angles, state bistability, and low power consumption when compared with liquid crystal displays. Nevertheless, problems with the long-term image quality of these displays have prevented their widespread usage. For example, particles that make up electrophoretic displays tend to settle, resulting in inadequate service-life for these displays.

As noted above, electrophoretic media require the presence of a fluid. In most prior art electrophoretic media, this fluid is a liquid, but electrophoretic media can be produced using gaseous fluids; see, for example, Kitamura, T., et al., "Electrical toner movement for electronic paper-like display", IDW Japan, 2001, Paper HCS1-1, and Yamaguchi, Y., et al., "Toner display using insulative particles charged triboelectrically", IDW Japan, 2001, Paper AMD4-4). See also U.S. Patent Publication No. 2005/0001810; European Patent Applications 1,462,847; 1,482,354; 1,484,635; 1,500,971; 1,501,194; 1,536,271; 1,542,067; 1,577,702; 1,577,703; and 1,598,694; and International Applications WO 2004/090626; WO 2004/079442; and WO 2004/001498. Such gas-based electrophoretic media appear to be susceptible to the same types of problems due to particle settling as liquid-based electrophoretic media, when the media are used in an orientation which permits such settling, for example in a sign where the medium is disposed in a vertical plane. Indeed, particle settling appears to be a more serious problem in gas-based electrophoretic media than in liquid-based ones, since the lower viscosity of gaseous suspending fluids as compared with liquid ones allows more rapid settling of the electrophoretic particles.

Numerous patents and applications assigned to or in the names of the Massachusetts Institute of Technology (MIT) and E Ink Corporation have recently been published describing encapsulated electrophoretic media. Such encapsulated media comprise numerous small capsules, each of which itself comprises an internal phase containing electrophoretically-mobile particles suspended in a liquid suspending medium, and a capsule wall surrounding the internal phase. Typically, the capsules are themselves held within a polymeric binder to form a coherent layer positioned between two electrodes. Encapsulated media of this type are described, for example, in U.S. Pat. Nos. 5,930,026; 5,961,804; 6,017,584; 6,067,185; 6,118,426; 6,120,588; 6,120,839; 6,124,851; 6,130,773; 6,130,774; 6,172,798; 6,177,921; 6,232,950; 6,249,271; 6,252,564; 6,262,706; 6,262,833; 6,300,932; 6,312,304; 6,312,971; 6,323,989; 6,327,072; 6,376,828; 6,377,387; 6,392,785; 6,392,786; 6,413,790; 6,422,687; 6,445,374; 6,445,489; 6,459,418; 6,473,072; 6,480,182; 6,498,114; 6,504,524; 6,506,438; 6,512,354; 6,515,649; 6,518,949; 6,521,489; 6,531,997; 6,535,197; 6,538,801; 6,545,291; 6,580,545; 6,639,578; 6,652,075; 6,657,772; 6,664,944; 6,680,725; 6,683,333; 6,704,133; 6,710,540; 6,721,083; 6,724,519; 6,727,881; 6,738,050; 6,750,473; 6,753,999; 6,816,147; 6,819,471; 6,822,782; 6,825,068; 6,825,829; 6,825,970; 6,831,769; 6,839,158; 6,842,167; 6,842,279; 6,842,657; 6,864,875; 6,865,010; 6,866,760; 6,870,661; 6,900,851; 6,922,276; 6,950,200; 6,958,848; 6,967,640; 6,982,178; 6,987,603; 6,995,550; 7,002,728; 7,012,600; 7,012,735; 7,023,420; 7,030,412; 7,030,854; 7,034,783; 7,038,655; 7,061,663; 7,071,913; 7,075,502; 7,075,703; 7,079,305; 7,106,296; 7,109,968; 7,110,163; 7,110,164; 7,116,318; 7,116,466; 7,119,759; 7,119,772; 7,148,128; 7,167,155; 7,170,670; 7,173,752; 7,176,880; 7,180,649; 7,190,008; 7,193,625; 7,202,847; 7,202,991; 7,206,119; 7,223,672; 7,230,750; 7,230,751; 7,236,790; and 7,236,792; and U.S. Patent Applications Publication Nos. 2002/0060321; 2002/0090980; 2003/0011560; 2003/0102858; 2003/0151702; 2003/0222315; 2004/0094422; 2004/0105036; 2004/0112750; 2004/0119681; 2004/0136048; 2004/0155857; 2004/0180476; 2004/0190114; 2004/0196215; 2004/0226820; 2004/0257635; 2004/0263947; 2005/0000813; 2005/0007336; 2005/0012980; 2005/0017944; 2005/0018273; 2005/0024353; 2005/0062714; 2005/0067656; 2005/0099672; 2005/0122284; 2005/0122306; 2005/0122563; 2005/0134554; 2005/0151709; 2005/0152018; 2005/0156340; 2005/0179642; 2005/0190137; 2005/0212747; 2005/0213191; 2005/0219184; 2005/0253777; 2005/0280626; 2006/0007527; 2006/0024437; 2006/0038772; 2006/0139308; 2006/0139310; 2006/0139311; 2006/0176267; 2006/0181492; 2006/0181504; 2006/0194619; 2006/0197736; 2006/0197737; 2006/0197738; 2006/0202949; 2006/0223282; 2006/0232531; 2006/0245038; 2006/0256425; 2006/0262060; 2006/0279527; 2006/0291034; 2007/0035532; 2007/0035808; 2007/0052757; 2007/0057908; 2007/0069247; 2007/0085818; 2007/0091417; 2007/0091418; 2007/0097489; 2007/0109219; 2007/0128352; and 2007/0146310; and International Applications Publication Nos. WO 00/38000; WO 00/36560; WO 00/67110; and WO 01/07961; and European Patents Nos. 1,099,207 B1; and 1,145,072 B1.

Many of the aforementioned patents and applications recognize that the walls surrounding the discrete microcapsules in an encapsulated electrophoretic medium could be replaced by a continuous phase, thus producing a so-called polymer-dispersed electrophoretic display, in which the electrophoretic medium comprises a plurality of discrete droplets of an electrophoretic fluid and a continuous phase of a polymeric material, and that the discrete droplets of electrophoretic fluid within such a polymer-dispersed electrophoretic display may be regarded as capsules or microcapsules even though no discrete capsule membrane is associated with each individual droplet; see for example, the aforementioned U.S. Pat. No. 6,866,760. Accordingly, for purposes of the present application, such polymer-dispersed electrophoretic media are regarded as sub-species of encapsulated electrophoretic media.

A related type of electrophoretic display is a so-called "microcell electrophoretic display". In a microcell electrophoretic display, the charged particles and the fluid are not encapsulated within microcapsules but instead are retained within a plurality of cavities formed within a carrier medium, typically a polymeric film. See, for example, U.S. Pat. Nos. 6,672,921 and 6,788,449, both assigned to Sipix Imaging, Inc.

Although electrophoretic media are often opaque (since, for example, in many electrophoretic media, the particles substantially block transmission of visible light through the display) and operate in a reflective mode, many electrophoretic displays can be made to operate in a so-called "shutter mode" in which one display state is substantially opaque and one is light-transmissive. See, for example, the aforementioned U.S. Pat. Nos. 6,130,774 and 6,172,798, and U.S. Pat. Nos. 5,872,552; 6,144,361; 6,271,823; 6,225,971; and 6,184,856. Dielectrophoretic displays, which are similar to electrophoretic displays but rely upon variations in electric field strength, can operate in a similar mode; see U.S. Pat. No. 4,418,346. Other types of electro-optic displays may also be capable of operating in shutter mode.

An encapsulated electrophoretic display typically does not suffer from the clustering and settling failure mode of traditional electrophoretic devices and provides further advantages, such as the ability to print or coat the display on a wide variety of flexible and rigid substrates. (Use of the word "printing" is intended to include all forms of printing and coating, including, but without limitation: pre-metered coatings such as patch die coating, slot or extrusion coating, slide or cascade coating, curtain coating; roll coating such as knife over roll coating, forward and reverse roll coating; gravure coating; dip coating; spray coating; meniscus coating; spin coating; brush coating; air knife coating; silk screen printing processes; electrostatic printing processes; thermal printing processes; ink jet printing processes; electrophoretic deposition (See US Patent Publication No. 2004/0226820); and other similar techniques.) Thus, the resulting display can be flexible. Further, because the display medium can be printed (using a variety of methods), the display itself can be made inexpensively.

Other types of electro-optic media may also be used in the displays of the present invention.

An electrophoretic display normally comprises a layer of electrophoretic material and at least two other layers disposed on opposed sides of the electrophoretic material, one of these two layers being an electrode layer. In most such displays both the layers are electrode layers, and one or both of the electrode layers are patterned to define the pixels of the display. For example, one electrode layer may be patterned into elongate row electrodes and the other into elongate column electrodes running at right angles to the row electrodes, the pixels being defined by the intersections of the row and column electrodes. Alternatively, and more commonly, one electrode layer has the form of a single continuous electrode and the other electrode layer is patterned into a matrix of pixel electrodes, each of which defines one pixel of the display. In another type of electrophoretic display, which is intended for use with a stylus, print head or similar movable electrode separate from the display, only one of the layers adjacent the electrophoretic layer comprises an electrode, the layer on the opposed side of the electrophoretic layer typically being a protective layer intended to prevent the movable electrode damaging the electrophoretic layer.

The manufacture of a three-layer electro-optic display normally involves at least one lamination operation. For example, in several of the aforementioned MIT and E Ink patents and applications, there is described a process for manufacturing an encapsulated electrophoretic display in which an encapsulated electrophoretic medium comprising capsules in a binder is coated on to a flexible substrate comprising indium-tin-oxide (ITO) or a similar conductive coating (which acts as an one electrode of the final display) on a plastic film, the capsules/binder coating being dried to form a coherent layer of the electrophoretic medium firmly adhered to the substrate. Separately, a backplane, containing an array of pixel electrodes and an appropriate arrangement of conductors to connect the pixel electrodes to drive circuitry, is prepared. To form the final display, the substrate having the capsule/binder layer thereon is laminated to the backplane using a lamination adhesive. (A very similar process can be used to prepare an electrophoretic display usable with a stylus or similar movable electrode by replacing the backplane with a simple protective layer, such as a plastic film, over which the stylus or other movable electrode can slide.) In one preferred form of such a process, the backplane is itself flexible and is prepared by printing the pixel electrodes and conductors on a plastic film or other flexible substrate. The obvious lamination technique for mass production of displays by this process is roll lamination using a lamination adhesive. Similar manufacturing techniques can be used with other types of electro-optic displays. For example, a microcell electrophoretic medium or a rotating bichromal member medium may be laminated to a backplane in substantially the same manner as an encapsulated electrophoretic medium.

As discussed in the aforementioned U.S. Pat. No. 6,982, 178, (see column 3, lines 63 to column 5, line 46) many of the components used in electrophoretic displays, and the methods used to manufacture such displays, are derived from technology used in liquid crystal displays (LCD's). For example, electrophoretic displays may make use of an active matrix backplane comprising an array of transistors or diodes and a corresponding array of pixel electrodes, and a "continuous" front electrode (in the sense of an electrode which extends over multiple pixels and typically the whole display) on a transparent substrate, these components being essentially the same as in LCD's. However, the methods used for assembling LCD's cannot be used with encapsulated electrophoretic displays. LCD's are normally assembled by forming the backplane and front electrode on separate glass substrates, then adhesively securing these components together leaving a small aperture between them, placing the resultant assembly under vacuum, and immersing the assembly in a bath of the liquid crystal, so that the liquid crystal flows through the aperture between the backplane and the front electrode. Finally, with the liquid crystal in place, the aperture is sealed to provide the final display.

This LCD assembly process cannot readily be transferred to solid electro-optic displays. Because the electro-optic material is solid, it must be present between the backplane and the front electrode before these two integers are secured to each other. Furthermore, in contrast to a liquid crystal material, which is simply placed between the front electrode and the backplane without being attached to either, a solid electro-optic medium normally needs to be secured to both; in most cases the solid electro-optic medium is formed on the front electrode, since this is generally easier than forming the medium on the circuitry-containing backplane, and the front electrode/electro-optic medium combination is then laminated to the backplane, typically by covering the entire surface of the electro-optic medium with an adhesive and laminating under heat, pressure and optionally vacuum.

As discussed in the aforementioned U.S. Pat. No. 6,312, 304, the manufacture of solid electro-optic displays also presents problems in that the optical components (the electro-optic medium) and the electronic components (in the backplane) have differing performance criteria. For example, it is desirable for the optical components to optimize reflectivity, contrast ratio and response time, while it is desirable for the electronic components to optimize conductivity, voltage-current relationship, and capacitance, or to possess memory, logic, or other higher-order electronic device capabilities. Therefore, a process for manufacturing an optical component may not be ideal for manufacturing an electronic component, and vice versa. For example, a process for manufacturing an electronic component can involve processing under high temperatures. The processing temperature can be in the range from about 300° C. to about 600° C. Subjecting many optical components to such high temperatures, however, can be harmful to the optical components by degrading the electro-optic medium chemically or by causing mechanical damage.

This patent describes a method of manufacturing an electro-optic display comprising providing a modulating layer including a first substrate and an electro-optic material provided adjacent the first substrate, the modulating layer being capable of changing a visual state upon application of an electric field; providing a pixel layer comprising a second substrate, a plurality of pixel electrodes provided on a front surface of the second substrate and a plurality of contact pads provided on a rear surface of the second substrate, each pixel electrode being connected to a contact pad through a via extending through the second substrate; providing a circuit layer including a third substrate and at least one circuit element; and laminating the modulating layer, the pixel layer, and the circuit layer to form the electro-optic display.

Electro-optic displays are often costly; for example, the cost of the color LCD found in a portable computer is typically a substantial fraction of the entire cost of the computer. As the use of electro-optic displays spreads to devices, such as cellular telephones and personal digital assistants (PDA's), much less costly than portable computers, there is great pressure to reduce the costs of such displays. The ability to form layers of some solid electro-optic media by printing techniques on flexible substrates, as discussed above, opens up the possibility of reducing the cost of electro-optic components of displays by using mass production techniques such as roll-to-roll coating using commercial equipment used for the production of coated papers, polymeric films and similar media. However, such equipment is costly and the areas of electro-optic media presently sold may be insufficient to justify dedicated equipment, so that it may typically be necessary to transport the coated medium from a commercial coating plant to the plant used for final assembly of electro-optic displays without damage to the relatively fragile layer of electro-optic medium.

Also, most prior art methods for final lamination of electrophoretic displays are essentially batch methods in which the electro-optic medium, the lamination adhesive and the backplane are only brought together immediately prior to final assembly, and it is desirable to provide methods better adapted for mass production.

The aforementioned U.S. Pat. No. 6,982,178 describes a method of assembling a solid electro-optic display (including an encapsulated electrophoretic display) which is well adapted for mass production. Essentially, this patent describes a so-called "front plane laminate" ("FPL") which comprises, in order, a light-transmissive electrically-conductive layer; a layer of a solid electro-optic medium in electrical contact with the electrically-conductive layer; an adhesive layer; and a release sheet. Typically, the light-transmissive electrically-conductive layer will be carried on a light-transmissive substrate, which is preferably flexible, in the sense that the substrate can be manually wrapped around a drum (say) 10 inches (254 mm) in diameter without permanent deformation. The term "light-transmissive" is used in this patent and herein to mean that the layer thus designated transmits sufficient light to enable an observer, looking through that layer, to observe the change in display states of the electro-optic medium, which will normally be viewed through the electrically-conductive layer and adjacent substrate (if present); in cases where the electro-optic medium displays a change in reflectivity at non-visible wavelengths, the term "light-transmissive" should of course be interpreted to refer to transmission of the relevant non-visible wavelengths. The substrate will typically be a polymeric film, and will normally have a thickness in the range of about 1 to about 25 mil (25 to 634 µm), preferably about 2 to about 10 mil (51 to 254 µm). The electrically-conductive layer is conveniently a thin metal or metal oxide layer of, for example, aluminum or ITO, or may be a conductive polymer. Poly(ethylene terephthalate) (PET) films coated with aluminum or ITO are available commercially, for example as "aluminized Mylar" ("Mylar" is a Registered Trade Mark) from E.I. du Pont de Nemours & Company, Wilmington Del., and such commercial materials may be used with good results in the front plane laminate.

Assembly of an electro-optic display using such a front plane laminate may be effected by removing the release sheet from the front plane laminate and contacting the adhesive layer with the backplane under conditions effective to cause the adhesive layer to adhere to the backplane, thereby securing the adhesive layer, layer of electro-optic medium and electrically-conductive layer to the backplane. This process is well-adapted to mass production since the front plane laminate may be mass produced, typically using roll-to-roll coating techniques, and then cut into pieces of any size needed for use with specific backplanes.

The aforementioned U.S. Pat. No. 6,982,178 also describes a method for testing the electro-optic medium in a front plane laminate prior to incorporation of the front plane laminate into a display. In this testing method, the release sheet is provided with an electrically conductive layer, and a voltage sufficient to change the optical state of the electro-optic medium is applied between this electrically conductive layer and the electrically conductive layer on the opposed side of the electro-optic medium. Observation of the electro-optic medium will then reveal any faults in the medium, thus avoiding laminating faulty electro-optic medium into a display, with the resultant cost of scrapping the entire display, not merely the faulty front plane laminate.

The aforementioned U.S. Pat. No. 6,982,178 also describes a second method for testing the electro-optic medium in a front plane laminate by placing an electrostatic charge on the release sheet, thus forming an image on the electro-optic medium. This image is then observed in the same way as before to detect any faults in the electro-optic medium.

The aforementioned 2004/0155857 describes a so-called "double release sheet" which is essentially a simplified version of the front plane laminate of the aforementioned U.S. Pat. No. 6,982,178. One form of the double release sheet comprises a layer of a solid electro-optic medium sandwiched between two adhesive layers, one or both of the adhesive layers being covered by a release sheet. Another form of the double release sheet comprises a layer of a solid electro-optic medium sandwiched between two release sheets. Both forms of the double release film are intended for use in a process generally similar to the process for assembling an electro-optic display from a front plane laminate already described, but involving two separate laminations; typically, in a first lamination the double release sheet is laminated to a front electrode to form a front sub-assembly, and then in a second lamination the front sub-assembly is laminated to a backplane to form the final display, although the order of these two laminations could be reversed if desired.

The aforementioned copending application Ser. No. 11/550,114 describes a so-called "inverted front plane laminate", which is a variant of the front plane laminate described in the aforementioned U.S. Pat. No. 6,982,178. This inverted front plane laminate comprises, in order, at least one of a light-transmissive protective layer and a light-transmissive electrically-conductive layer; an adhesive layer; a layer of a solid electro-optic medium; and a release sheet. This inverted front plane laminate is used to form an electro-optic display having a layer of lamination adhesive between the electro-optic layer and the front electrode or front substrate; a second, typically thin layer of adhesive may or may not be present between the electro-optic layer and a backplane. Such electro-optic displays can combine good resolution with good low temperature performance. This copending application also describes coloring the layer of lamination adhesive between the electro-optic layer and the front electrode to form a color filter.

Most types of electro-optic media have only a limited number of optical states, for example a dark (black) state, a light (white) state and, in some cases, one or more intermediate gray states. Accordingly, to construct a full color display using such media, it is common practice to place an electro-optic medium adjacent a color filter having, for example, multiple red, green and blue areas, and to provide a driving arrangement for the electro-optic medium which permits independent control of the medium adjacent each red, green or blue area. Certain applications of color filters with electrophoretic displays are described in the aforementioned U.S. Pat. No. 6,864,875. The aforementioned 2003/0011560 describes ways for modifying the optical properties of electrophoretic displays by incorporating an optical biasing element in any one of several components of the display.

Choosing the optimum method for providing a color filter array in an electro-optic display is more complex than it might at first appear, and involves a number of often-conflicting desiderata. It is desirable to keep the color filter array as close to the electro-optic layer as possible, since any significant spacing between the two may lead to parallax, which in turn can distort the colors seen when the display is viewed off-axis (i.e., in a direction other than perpendicular to the viewing surface). However, it is also necessary to consider the ease of incorporation of the color filter array into the selected position within the display; for example, it is relatively easy to attach a pre-formed color filter array on to the viewing surface of the display, but it may be substantially more difficult to place a color filter array between two interior layers of the display. In addition, the colored areas of the color filter array need to be aligned with the pixel electrodes on the backplane of the display to ensure that, for example, a pixel which is supposed to show red when the electro-optic medium is in a white optical state does not show a mixture of red and blue, thus gravely distorting the intended colors of the image. In this regard, it should be noted that thin front plane laminates (including inverted front plane laminates) and double release films tend to change size slightly during laminations, and even a small change in size can have severe effects on the electro-optic performance of the resulting display. For example, if a backplane has 500 pixels per row, and a front plane laminate provided with a color filter array accurately spaced to align with the pixels changes its dimensions by 0.1 percent during lamination, if the front plane laminate is accurately aligned with the pixels at one end of the row, it will be mis-aligned by one-half of a pixel at the other end, with severe degradation of the color image at this other end of the row. Finally, there is a need to consider the type of display being produced; many types of color filter arrays, for example glass-based arrays, are too rigid for incorporation into flexible displays.

It has now been discovered that useful color filter arrays can be produced by ink jet printing colored areas on to various surfaces of an electro-optic display, or the corresponding surfaces of a front plane laminate, inverted front plane laminate or double release film used to produce such a display, and this invention relates to this process and to the products thereof.

SUMMARY OF THE INVENTION

In one aspect, this invention provides a (first) process for preparing a layer of electro-optic material having a color filter array thereon, which process comprises ink jet printing a plurality of colored areas on one surface of the layer of electro-optic material.

This first process of the present invention may hereinafter for convenience be called the "electro-optic layer printing" or "EOLP" process of the invention. Typically, this process will be used to print a full color filter array having two, three or four colors, although more colors can be used if desired. Thus, in a typical EOLP process, a plurality of first colored areas and a plurality of second colored areas are printed on the surface of the layer of electro-optic material, the first and second colored areas being of different colors.

The EOLP process may be used with any of the types of electro-optic materials discussed above. Thus, for example, in the EOLP process, the electro-optic material may comprise a rotating bichromal member material or a microcell electrophoretic material. Alternatively, the electro-optic material may comprise an encapsulated electrophoretic material comprising a plurality of capsules in a binder, or a polymer-dispersed electrophoretic material. The ink used may be radiation curable, so that after the ink has been printed it is exposed to radiation effective to cure the ink. Alternatively, the ink used may be solvent-based, that is to say may comprise pigment particles in an organic solvent.

The EOLP process may be carried out while the layer of electro-optic material is disposed on a backplane comprising at least one pixel electrode. The EOLP process may include the additional step of laminating an adhesive layer over said one surface of the layer of electro-optic material.

In another aspect, this invention provides a layer of electro-optic material having a plurality of colored areas printed on one surface thereof. This aspect of the present invention may hereinafter for convenience be called the "printed electro-optic layer" or "PEOL" aspect of the invention. Typically, the printed layer will be in the form of a full color filter array having two, three or four colors, although more colors can be used if desired. Thus, a typical PEOL will have a plurality of first colored areas and a plurality of second colored areas printed on its surface, the first and second colored areas being of different colors.

A PEOL may use any of the types of electro-optic materials discussed above. Thus, for example, in a PEOL, the electro-optic material may comprise a rotating bichromal member material or a microcell electrophoretic material. Alternatively, the electro-optic material may comprise an encapsulated electrophoretic material comprising a plurality of capsules in a binder, or a polymer-dispersed electrophoretic material.

This invention extends to a printed electro-optic layer disposed on a backplane comprising at least one pixel electrode, and to a PEOL having an adhesive layer laminated over the printed surface of the layer of electro-optic material.

This invention also extends to front plane laminates, double release films and inverted front plane laminates incorporating printed electro-optic layers of the invention. Thus, this invention provides an article of manufacture (a front plane laminate) comprising, in order: a light-transmissive electrically-conductive layer; a layer of a solid electro-optic medium in electrical contact with the electrically-conductive layer; an adhesive layer; and a release sheet, wherein the layer of a solid electro-optic medium is a PEOL of the present invention. This invention also provides an article of manufacture (a double release film) comprising: a layer of a solid electro-optic medium having first and second surfaces on opposed sides thereof; a first adhesive layer on the first surface of the layer of solid electro-optic medium; a release sheet disposed on the opposed side of the first adhesive layer from the layer of solid electro-optic medium; and a second adhesive layer on the second surface of the layer of solid electro-optic medium, wherein the layer of a solid electro-optic medium is a PEOL of the present invention. This invention also provides an article of manufacture (a double release sheet) comprising: a layer of a solid electro-optic medium having first and second surfaces on opposed sides thereof; a first release sheet covering the first surface of the layer of solid electro-optic medium; and a second release sheet covering the second surface of the layer of solid electro-optic medium, wherein the layer of a solid electro-optic medium is a PEOL of the present invention. Finally, this invention provides an article of manufacture (an inverted front plane laminate) comprising, in order: a release sheet; a layer of a solid electro-optic medium; an adhesive layer; and at least one of a light-transmissive protective layer and a light-transmissive electrically-conductive layer, wherein the layer of a solid electro-optic medium is a PEOL of the present invention.

Another major aspect of the present invention relates to printing of colored areas on adhesive layers, desirably adhesive layers already associated with electro-optic layers. Thus, this invention provides a process for preparing a sub-assembly useful for forming a color electro-optic display, the process comprising providing a sub-assembly comprising a layer of electro-optic material and an adhesive layer having an exposed surface, and ink jet printing a plurality of colored areas on the exposed surface of the adhesive layer.

This aspect of the present invention may hereinafter for convenience be called the "adhesive layer printing" or "ALP" aspect of the invention. Typically, this process will be used to print a full color filter array having two, three or four colors, although more colors can be used if desired. Thus, in a typical ALP process, a plurality of first colored areas and a plurality of second colored areas are printed on the surface of the layer of electro-optic material, the first and second colored areas being of different colors.

The ALP process may be used with any of the types of electro-optic materials discussed above. Thus, for example, in the ALP process, the electro-optic material may comprise a rotating bichromal member material or a microcell electrophoretic material. Alternatively, the electro-optic material may comprise an encapsulated electrophoretic material comprising a plurality of capsules in a binder, or a polymer-dispersed electrophoretic material. The ink used may be radiation curable, so that after the ink has been printed it is exposed to radiation effective to cure the ink. Alternatively, the ink used may be solvent-based, that is to say may comprise pigment particles in an organic solvent.

The ALP process may be carried out with the layer of electro-optic material disposed on a backplane comprising at least one pixel electrode, with the adhesive layer being disposed on the opposed side of the layer of electro-optic material from the backplane.

This invention extends to color printed adhesive layers such as those produced by the ALP process. Thus, this invention extends to a sub-assembly useful for forming a color electro-optic display, the sub-assembly comprising a layer of electro-optic material and an adhesive layer, the adhesive layer having a plurality of colored areas printed on one surface thereof.

This aspect of the present invention may hereinafter for convenience be called the "printed adhesive layer sub-assembly" or "PALSA" aspect of the invention. Typically, the printed adhesive layer will be in the form of a full color filter array having two, three or four colors, although more colors can be used if desired. Thus, a typical PALSA will have a plurality of first colored areas and a plurality of second colored areas printed on its surface, the first and second colored areas being of different colors. The plurality of colored areas may be printed on the surface of the adhesive layer remote from the layer of electro-optic material or on the surface of the adhesive layer adjacent the layer of electro-optic material.

A PALSA may use any of the types of electro-optic materials discussed above. Thus, for example, in a PALSA, the electro-optic material may comprise a rotating bichromal member material or a microcell electrophoretic material. Alternatively, the electro-optic material may comprise an encapsulated electrophoretic material comprising a plurality of capsules in a binder, or a polymer-dispersed electrophoretic material.

This invention extends to a PALSA disposed on a backplane comprising at least one pixel electrode, and to a PALSA having a second adhesive layer laminated over the surface of the layer of electro-optic material remote from the adhesive layer bearing the plurality of colored areas.

A PALSA can form part of a front plane laminate, double release film or inverted front plane laminate. Thus, this invention provides an article of manufacture (a front plane laminate) comprising, in order: a light-transmissive electrically-conductive layer; a layer of a solid electro-optic medium in electrical contact with the electrically-conductive layer; an adhesive layer; and a release sheet, wherein the layer of the solid electro-optic medium and the adhesive layer form a PALSA of the present invention. This invention also provides an article of manufacture (a double release film) comprising: a layer of a solid electro-optic medium having first and second surfaces on opposed sides thereof; a first adhesive layer on the first surface of the layer of solid electro-optic medium; a release sheet disposed on the opposed side of the first adhesive layer from the layer of solid electro-optic medium; and a second adhesive layer on the second surface of the layer of solid electro-optic medium, wherein one of the adhesive layers has a plurality of colored areas printed thereon. Finally, this invention provides an article of manufacture (an inverted front plane laminate) comprising, in order: a release sheet; a layer of a solid electro-optic medium; an adhesive layer; and at least one of a light-transmissive protective layer and a light-transmissive electrically-conductive layer, wherein the layer of the solid electro-optic medium and the adhesive layer form a PALSA of the present invention.

A third major aspect of the present invention relates to printing colored areas on the protective layers (also often referred to as "front substrates") of electro-optic displays and sub-assemblies used for forming such displays. Thus, this invention provides a process for preparing a color electro-optic display (or a sub-assembly which can later be used to form such a display), the process comprising providing a film comprising a layer of electro-optic material and a protective layer having an exposed surface, and ink jet printing a plurality of colored areas on the exposed surface of the protective layer.

This aspect of the present invention may hereinafter for convenience be called the "protective layer printing" or "PLP" aspect of the invention. Typically, this process will be used to print a full color filter array having two, three or four colors, although more colors can be used if desired. Thus, in a typical PLP process, a plurality of first colored areas and a plurality of second colored areas are printed on the surface of the layer of electro-optic material, the first and second colored areas being of different colors. In the PLP process, the film may further comprise a light-transmissive electrically conductive layer disposed between the protective layer and the layer of electro-optic material. Also, in a PLP process, prior to printing of the ink, the exposed surface of the protective layer may be coated with an ink receiving medium for enhancing the adhesion of the ink to the protective sheet.

The PLP process may be used with any of the types of electro-optic materials discussed above. Thus, for example, in the PLP process, the electro-optic material may comprise a rotating bichromal member material or a microcell electrophoretic material. Alternatively, the electro-optic material may comprise an encapsulated electrophoretic material comprising a plurality of capsules in a binder, or a polymer-dispersed electrophoretic material. The ink used may be radiation curable, so that after the ink has been printed it is exposed to radiation effective to cure the ink. Alternatively, the ink used may be solvent-based, that is to say may comprise pigment particles in an organic solvent.

The PLP process may be carried out with the layer of electro-optic material disposed on a backplane comprising at least one pixel electrode, with the protective layer being disposed on the opposed side of the layer of electro-optic material from the backplane.

This invention also provides a film for use in forming a color electro-optic display, the film comprising a layer of electro-optic material and a protective layer having an exposed surface, the protective layer having a plurality of colored areas printed on its exposed surface.

This aspect of the present invention may hereinafter for convenience be called the "printed protective film" or "PPF" aspect of the invention. Typically, the printed protective layer will be in the form of a full color filter array having two, three or four colors, although more colors can be used if desired. Thus, a typical PPF will have a plurality of first colored areas and a plurality of second colored areas printed on its surface, the first and second colored areas being of different colors.

A PPF may use any of the types of electro-optic materials discussed above. Thus, for example, in a PPF, the electro-optic material may comprise a rotating bichromal member material or a microcell electrophoretic material. Alternatively, the electro-optic material may comprise an encapsulated electrophoretic material comprising a plurality of capsules in a binder, or a polymer-dispersed electrophoretic material. This invention extends to a PPF disposed on a backplane comprising at least one pixel electrode, and to an article of manufacture (an inverted front plane laminate) comprising, in order: a release sheet; a layer of a solid electro-optic medium; an adhesive layer; and a light-transmissive protective layer, wherein the protective layer has a plurality of colored areas printed on its surface remote from the adhesive layer.

A fourth major aspect of the present invention relates to methods for providing colored areas on displays at locations registered with the pixel electrodes on the backplanes of such displays. One such process for providing printed colored areas on an electro-optic display, the process comprises: providing a display comprising a backplane bearing a plurality of pixel electrodes and a layer of an electro-optic material disposed on the backplane, the display having an exposed surface remote from the backplane; applying voltages to the pixel electrodes and thereby forming an image on the layer of electro-optic material; detecting the image; and ink jet printing the colored areas on the exposed surface in registry with the detected image.

This aspect of the present invention may hereinafter for convenience be called the "registered ink jet printing" or "RIJP" aspect of the invention. In this process, the colored areas may be printed on the layer of electro-optic material, or on an over-layer superposed over the layer of electro-optic material. This over-layer may be an adhesive layer, a light-transmissive electrode or a protective layer.

Finally, this invention provides a process for placing a color filter array on an electro-optic display, the process comprising: providing a color filter array; providing a display comprising a backplane bearing a plurality of pixel electrodes and a layer of an electro-optic material disposed on the backplane, the display having an exposed surface remote from the backplane; applying voltages to the pixel electrodes and thereby forming an image on the layer of electro-optic material; detecting the image; and securing the color filter array on the exposed surface in registry with the detected image. This aspect of the present invention may hereinafter for convenience be called the "registered color filter array placement" or "RCFAP" aspect of the invention.

When printing is effected on an electro-optic material in the present invention and the electro-optic material is a rotating bichromal member material or a microcell electrophoretic material, or in the PLP process, printing is effected on a polymer surface, and it is within the skill of the ink jet art to print on such polymeric surfaces. Those skilled in ink jet printing will be aware of various materials (for example, hydrophilic polymers such as gelatin, poly(vinyl alcohol) and polyvinylpyridine, or transparent microporous layers) which may be applied to polymeric surfaces to enhance the adhesion of ink jet inks thereto or to improve print resolution, durability, and/or color density characteristics. The electro-optic material used can also be an encapsulated electrophoretic material, of either the type comprising a plurality of capsules (usually in a polymeric binder) or of the polymer-dispersed type. Rather surprisingly, it has been found that such a capsule layer is a good receiver for ink jet inks and that at least some conventional ink jet colorants do not substantially interfere with the electro-optic performance of the electro-optic material. Accordingly, any color image, including a red/green/blue, red/green/blue/white or cyan/magenta/yellow color filter array can be rapidly and conveniently deposited on the electro-optic material at high resolution. The resulting modified electro-optic layer with color filter array included can then be incorporated into an electro-optic display in any of the ways described in the aforementioned patents and applications, including processes making use of front plane laminates, inverted front plane laminates, and double release films, as mentioned above. Similarly, it has been found that many lamination adhesives used in electro-optic displays can be ink jet printed in a similar manner with good results. With both electro-optic materials and lamination adhesives, it may be desirable to pre-treat the surfaces with materials, such as those discussed above, to improve the characteristics of the printed ink jet image on the electro-optic material and lamination adhesive.

DETAILED DESCRIPTION

Figure 1:
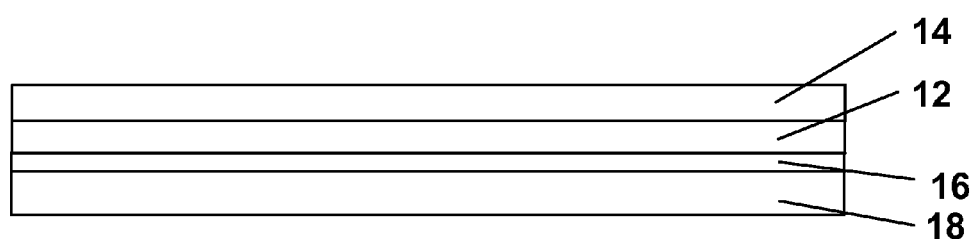
FIGS. 1 to 4 of the accompanying drawings are schematic elevations showing various stages in a preferred electro-optic layer printing process of the present invention starting from a double release film.

As already mentioned, various aspects of the present invention make use of ink jet printing (including, possibly, so-called "solid ink jet printing" where the ink solidifies on contact with the surface being printed rather than drying on this surface) to form colored areas, and typically a color filter array, on the surface of an electro-optic material, lamination adhesive or protective layer used to form an electro-optic display. Hereinafter, the invention will mainly be described with reference to the formation of three or four color filter arrays, but it should be borne in mind that the invention extends to simpler processes involving only one or two colors, and to processes involving more than four colors.

Although other color printing methods could, in principle, be used in place of ink jet printing; ink jet printing has the advantage that no colorant donor medium actually comes in contact with the layer being printed. Such contact can lead to severe problems; for example, an attempt to use a dye sublimation (dye diffusion thermal transfer) printer in a modification of an electro-optic layer printing process of the present invention led to the welding of the electro-optic layer to the dye donor sheet.

It will be seen from the description above that the present invention provides numerous different processes for the formation of color filter arrays, and the choice of which specific process is adopted will in many cases be governed by the exact structure of the electro-optic display, the thicknesses of the various layers therein, and the processes used to assemble the various layers of the display. Typically (see, for example, FIG. 10 of the aforementioned U.S. Pat. No. 6,982,178 and FIG. 3 of the aforementioned 2007/0109219), an electro-optic display comprises (reading from the viewing surface to the backplane, downwardly as illustrated in these two Figures):

(a) (optionally) barrier and other auxiliary protective layers;
(b) a protective layer/front substrate;
(c) a front electrode layer (in practice, layers (b) and (c) are often formed from a commercial two-layer film, such as poly(ethylene terephthalate)/indium tin oxide, so that it is not possible for the manufacturer of an electro-optic display to insert anything between these two layers);
(d) (optionally) a front adhesive layer;
(e) a layer of electro-optic material;
(f) a rear adhesive layer; and
(g) a backplane bearing pixel electrodes.

Since the electro-optic material is often opaque, a color filter array must normally lie between the electro-optic layer (e) and the viewing surface of the display. Furthermore, it is usually desired to keep the color filter array as close to the electro-optic layer as possible to avoid parallax problems. Hence, it is generally undesirable to place the color filter array (CFA) on the outside surface of layer (a) both because of the large separation from the electro-optic layer and because of the risk of mechanical damage to the CFA. This, there are potentially three interfaces where the CFA can be located, namely interfaces a/b, c/d and d/e. Furthermore, for each interface the CFA can be formed by printing on either one of the two adjacent layers. However, if is desired to print the CFA already registered with the backplane, it is advantageous to print on the layer closer to the backplane, provided that layer is already attached to the backplane at the time printing occurs.

It should be noted that if the CFA is printed at interface c/d or d/e, the CFA will lie between the electrodes of the display, whereas if the CFA is printed at interface a/b it will not lie between the electrodes, and the required properties of the ink used differ in the two cases. If the CFA lies between the electrodes, it is important that the dielectric constant not be too high or kickback may occur. ("Kickback" or "Self-erasing" is a phenomenon observed in some electro-optic displays (see, for example, Ota, I., et al., "Developments in Electrophoretic Displays", Proceedings of the SID, 18, 243 (1977), where self-erasing was reported in an unencapsulated electrophoretic display) whereby, when the voltage applied across the display is switched off, the electro-optic medium may at least partially reverse its optical state, and in some cases a reverse voltage, which may be larger than the operating voltage, can be observed to occur across the electrodes.) Conversely, if the CFA lies between the electrodes, it is important that the conductivity of the ink not be too high or blooming may occur. ("Blooming" is a phenomenon whereby the area of the electro-optic layer which changes optical state in response to change of voltage at a pixel electrode is larger than the pixel electrode itself) Humectants, non-aqueous solvents, and surfactants are commonly employed in commercial ink jet inks, and these materials can potentially interfere with the electro-optic properties of the electro-optic material, for example by changing the conductivity of the electro-optic layer, and hence can cause unexpected behavior if present between the display electrodes. Also, in all processes of the present invention the colorants in the ink should be transparent when dry, so that either dyes or very small particle pigmented inks should be used. Transparent pigmented inks are highly desirable in the present process, because such inks will not penetrate appreciably into the electro-optic layer, and, when the electro-optic layer is an electrophoretic layer, cannot interact unfavorably with the internal phase (electrophoretic particles and surrounding fluid) of this electrophoretic layer. Radiation curable (typically ultraviolet curable) inks have been found very suitable for use in the present processes, as have (organic) solvent-based pigment inks. The latter can be formulated using very small amounts of polymeric binders so that the dried ink layer is of minimal thickness and minimal effect on the performance of the electro-optic material. Subject to the foregoing considerations, any known type of ink jet printer can be used. Clearly, for very high resolution, good positioning and uniform ink deposition is important.

Furthermore, as already mentioned the choice of which layer is to ink jet printed by a process of the present invention to form a CFA is greatly affected by the "construction method" used to form the display (i.e., the order in which the various layers are assembled to form the display). Three common constructions methods will now be discussed, although others will ready by apparent to those skilled in the technology of electro-optic displays.

Construction Method A

As described in the aforementioned U.S. Pat. No. 6,982, 178, one method commonly used to produce electro-optic, and especially encapsulated or polymer-dispersed electrophoretic, displays begins by coating the electrophoretic medium on to a PET/ITO film. Separately, a lamination adhesive is coated on to a release sheet. The lamination adhesive/release sheet sub-assembly is then laminated to the electrophoretic layer to form a front plane laminate, typically on a roll-to-roll basis. The front plane laminate is then cut to a size needed for an individual display, the release sheet is removed and the remaining layers laminated to a backplane, typically a thin film transistor (TFT) active matrix backplane. In this process, because the electrophoretic material layer, layer (e) above, is deposited directly on the front substrate/front electrode layer, layers (b)/(c) above, with no intervening front adhesive layer (d), the only surface available for ink jet printing is the exposed surface of the front substrate, layer (b), i.e., a PLP method of the present invention needs to be used. Ink jet printing on this surface after the front plane laminate has been laminated to the backplane is essentially printing on a fully-functional active matrix display. Thus, the display can be imaged to a fiducial pattern before printing the CFA, thus taking advantage of an RIJP process of the present invention and easing registration of the color filter array with the pixel electrodes in the backplane.

Construction Method B

Other less common methods for producing electro-optic displays offer more options for introducing a color filter array by ink jet printing. One such method is to coat the electro-optic material directly on to a backplane, separately coat lamination adhesive to a PET/ITO front substrate, and laminate the two resulting sub-assemblies together. This method allows ink jet printing of a CFA directly on to the electro-optic layer before the final lamination step. Such an EOLP process of the present invention has an advantage that the CFA is in intimate contact with, and hence as close as possible to, the electro-optic layer, thereby eliminating any possible light-piping or parallax problems due to light entering through one CFA sub-pixel and leaving through a different sub-pixel. However, this approach does limit the choice of ink jet inks as discussed above, as the CFA is interposed between the two electrodes and in contact with the electro-optic layer. It also requires coating the electro-optic material directly on to the backplane, which is typically a batch process instead of the roll-to-roll process possible in Construction Method A above.

A variant of the construction method described in the preceding paragraph using a double release sheet permits roll-to-roll coating of the electro-optic material. In this variant, the electro-optic material is coated on to a disposable first release sheet. Separately, a lamination adhesive is coated on to a second release sheet, and the lamination adhesive is laminated to the electro-optic material to form a double release sheet having the structure first release sheet/electro-optic material/lamination adhesive/second release sheet. The second release sheet is then removed, and the remaining layers laminated to a backplane. The first release sheet can then be removed and a PET/ITO front substrate/front electrode laminated over the electro-optic material to produce a final display having the optional front adhesive layer. As discussed in the aforementioned 2007/0109219, this method also requires judicious use of differential release sheets to enable the second release sheet to be peeled from the double release film without disturbing the first release sheet.

Construction Method C

As already indicated, a preferred ALP process of the invention involves ink jet printing on a lamination adhesive layer overlying an electro-optic layer, which is itself already in position on a backplane. A preferred method for forming the lamination adhesive/electro-optic layer/backplane intermediate structure, which minimizes the number of times the (typically) fragile backplane is laminated is as follows. A first release sheet/electro-optic material/lamination adhesive/second release sheet structure is formed as described in Construction Method B above. However, in this case, a second lamination adhesive layer is coated on to a third release sheet, the first release sheet is removed and the electro-optic layer laminated to the second lamination adhesive layer to form a double release film. One of the release sheets is removed from this double release film and the remaining layers laminated to a backplane. This method also requires judicious use of differential release sheets.

One preferred form of the EOLP process of the present invention comprises the following steps:
(a) a layer of an encapsulated electrophoretic material or polymer-dispersed electrophoretic material is coated on to a backplane comprising at least one pixel electrode;
(b) a color filter array is printed directly on the electrophoretic material layer using an ink jet printer;
(c) the electrophoretic material layer, color filter array and backplane are dried in an oven to remove the volatile components of the ink jet ink; and
(d) the electrophoretic material layer with the dried color filter array thereon is laminated via a lamination adhesive to a front substrate which provides a light-transmissive front electrode for the final display and (normally) a protective layer which supports and provides mechanical protection to this front electrode, and optionally any desired barrier or radiation-absorbing layers; this step is conveniently effected by coating a layer of the lamination adhesive on a release sheet, drying the lamination adhesive layer, laminating the dried layer to the surface of the electrophoretic material layer, peeling the release sheet and then laminating the thus-exposed surface of the lamination adhesive to the front substrate.

It is well known to those skilled in the technology of encapsulated electrophoretic media that, as described in some of the aforementioned E Ink and MIT patents and applications, when an encapsulated electrophoretic medium, including a polymer-dispersed electrophoretic medium, is coated on a smooth surface, such as the surface of a release sheet, the resultant layer of electrophoretic medium has a smooth surface facing the surface on which it is coated and a rough surface on its opposed side, the roughness of this surface being caused by shrinkage of the medium as it is dried or cured, and consequent protrusion of capsule or droplets from the surrounding surface. The preferred process of the invention described above places the color filter array on the rough surface of the electrophoretic medium. If it is desired to form the color filter array on the smooth side of the electrophoretic medium (which may, at least in some cases, result in more precise printing of the color filter array), the electrophoretic medium may be coated on a release layer, and laminated to a backplane with lamination adhesive. (This is conveniently done in the manner described in the aforementioned U.S. Pat. No. 7,110,164 by coating the electrophoretic medium on a first release sheet, coating the lamination adhesive on a second release sheet, laminating the two resultant structures together with the lamination adhesive contacting the electrophoretic medium, and thereafter peeling the second release sheet from the lamination adhesive; the two release sheets of course being chosen so that this peeling can be effected without disturbing the first release sheet.) After this lamination, the first release sheet is removed from the electrophoretic medium and the color filter array printed on the smooth side of the electrophoretic medium thus exposed. The remaining steps of the process are essentially unchanged.

Figure 2:
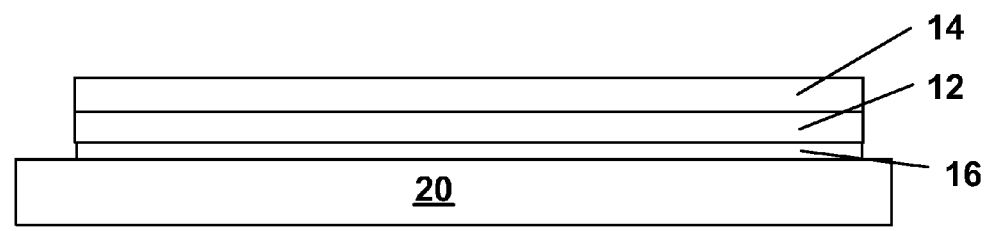

A second preferred EOLP process of the invention, illustrated in the accompanying drawings, can readily be applied to the production of an active matrix display. The drawings are not strictly to scale; in particular, the thicknesses of the various layers are greatly exaggerated relative to the lateral dimensions of the layers. The process begins as described in the aforementioned U.S. Pat. No. 7,110,164 by coating an electrophoretic medium 12 on a first release sheet 14, coating as thin a layer as possible of a lamination adhesive 16 on a second release sheet 18, and laminating the two resultant structures together with the lamination adhesive 16 contacting the electrophoretic medium 12, to form the structure shown in FIG. 1. Thereafter, the second release sheet 18 is peeled from the lamination adhesive 16, and the remaining layers 12, 14 and 16 are laminated to an active matrix backplane 20 provided with fiducial marks (not shown) to form the structure shown in FIG. 2. High precision registration is not required during this lamination.

Figure 3:
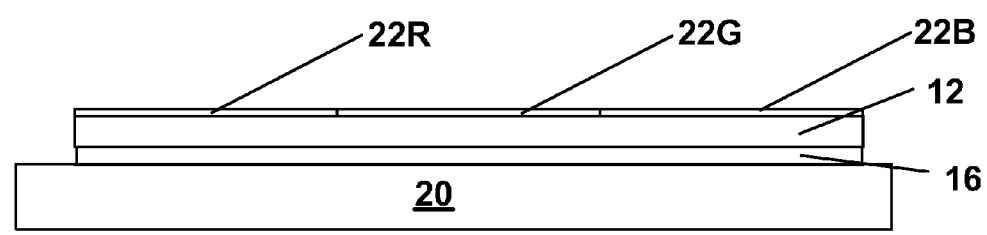

The first release sheet 14 is then removed from the electrophoretic medium 12, thus exposing the smooth surface of this medium, and a color filter array (indicated schematically as comprising red, green and blue color stripes 22R, 22G and 22B respectively in FIG. 3) is ink jet printed on this smooth surface using a high precision inkjet printer and positioning system relying upon the fiducial marks formed on the backplane 22. In a manufacturing environment, this step is easily automated. Note that this technique avoids delicate alignment of a pre-formed color filter array with the backplane, the positioning and alignment of the color filter array being controlled by the fiducial marks formed on the backplane 22 itself. The fiducial marks themselves can readily be located with high accuracy as part of the patterning procedures used during manufacture of the backplane.

Figures 4, 5:
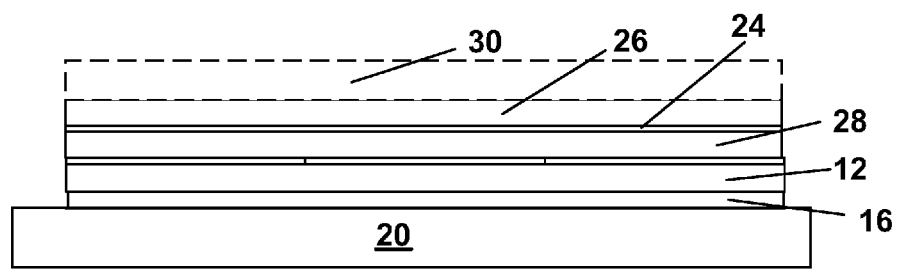
FIG. 5 illustrates the array of colored sub-pixels used in the preferred protective layer printing process of the present invention described in Example 2 below.

The color filter array is then dried by any convenient method, and a front substrate comprising a transparent electrode 24 and a support layer 26 is laminated over the color filter array by means of a lamination adhesive 28, as shown in FIG. 4. For reasons discussed in the aforementioned 2007/0109219, the lamination adhesive 28 is desirably relatively conductive to provide the final display with good low temperature performance characteristics. Finally, if desired any barrier layers 30 may be provided over the support layer 26 to provide moisture and oxygen barriers and ultra-violet radiation filtering. Edge seals may also be provided around the periphery of the display, as described for example in the aforementioned U.S. Pat. No. 6,982,178.

Note that in both preferred EOLP processes of the present invention described above, the color filter array is formed on the electrophoretic medium layer after that layer is already present on the backplane. Forming the color filter array in this manner avoids any problems caused by dimensional changes in an electrophoretic layer bearing a color filter array during lamination of such an electrophoretic layer to a backplane.

Typically, in the various processes of the present invention, it is desirable that the colorant in the ink jet ink be confined as close as possible to the surface of the layer to which it is applied. When the ink jet ink is being applied to the electro-optic layer itself, such confinement is desirable not only because the surface of electro-optic layer is where the colorant serves its color-controlling function, but also because such confinement of the colorant renders it less likely to compromise the electro-optic performance of the electro-optic layer. In other processes, it is generally desirable to avoid the ink diffusing through the layer to which it is applied since such diffusion may cause intermixing of various colored areas and thus degradation of the color shown on the display. The use of transparent pigmented inks is therefore preferred. If dye-based inks are to be used, it may be desirable to include mordant polymers in the layer to which the ink is applied, for example as a constituent of the binder in an encapsulated electrophoretic medium layer. Such mordant polymers contain groups capable of binding otherwise soluble dyes and confining them to a surface portion of the ink-receiving layer. The preferred binders for use in encapsulated electrophoretic media are typically anionically charged, and hence can be expected to act as mordants for cationic dyes, so cationic inks are preferred for use with such binders. Incorporation of metal ions into the ink-receiving layer may mordant suitable ink jet dyes or precursors by coordination of the metal. The resulting complexed, mordanted dyes frequently show enhanced stability against photo-degradation.

Most ink jet inks, particularly those for use in inexpensive printers designed for home and small office use, contain substantial amounts of humectants, for example ethylene glycol, methoxy ethanol, glyme, and other similar hydrophilic species. These materials tend to be deleterious in the present process, and their use should be minimized. A commercial ink jet ink formulation can be produced with very much smaller humectant concentrations, since a major function of these materials is to prevent nozzle clogging caused by drying of the printer ink. Ink jet inks with minimal amounts of humectants are preferred for use in the present process. To the extent that humectants are necessary, volatile materials with minimal ability to swell the ink-receiving layer, and especially the cell walls of encapsulated electrophoretic media, should be used.

Ink jet inks often contain surfactants, some of which may show deleterious effects in electro-optic media, for example by affecting the switching performance of encapsulated electrophoretic media, the internal phases of which often contain surfactants carefully chosen to maintain electrophoretic particle stability and switching performance. Anionic surfactants, particularly those with very low critical micelle concentrations, appear to be particularly problematical in this respect. In any case, the surfactant type and concentration in the ink jet ink should be optimized and minimized for the present process, and for compatibility with electro-optic performance.

The following Examples are now given, though by way of illustration only, to show details of particularly preferred reagents, conditions and techniques used in the processes of the present invention.

Example 1

This Example illustrates an adhesive layer printing process of the present invention using Construction Method C described above.

An encapsulated electrophoretic medium was prepared comprising gelatin/acacia capsules having an internal phase comprising polymer-coated titania white particles and polymer-coated copper chromite black particles in a hydrocarbon fluid. The capsules were formed into a slurry using an aqueous polyurethane binder substantially as described in Example 4 of the aforementioned U.S. Pat. No. 7,002,728. The resultant capsule slurry was slot coated on to a loose release sheet and dried to form a loose release sheet/capsule layer sub-assembly. Separately, a custom polyurethane adhesive was coated on to a tight release sheet, and then laminated to the loose release sheet/capsules layer sub-assembly, with the adhesive layer contacting the capsule layer. Separately, a polyacrylate adhesive was coated on to a loose release sheet. The loose release sheet was peeled from the capsule layer, and the exposed surface of the capsule layer laminated to the polyacrylate adhesive on the loose release sheet, to form a double release film having the following sequence of layers: loose release sheet/polyacrylate adhesive/capsule layer/polyurethane adhesive/tight release sheet.

From this double release film, there was laser cut a portion of a size appropriate for a 6.1 inch (155 mm) electrophoretic display. The loose release sheet was peeled from the polyacrylate adhesive and the remaining layers of the double release film were laminated to a 6.1 inch (155 mm) thin film transistor active matrix backplane. The tight release sheet was then peeled from the polyurethane adhesive to expose the surface of this adhesive for ink jet printing.

The exposed polyurethane adhesive surface was then ink jet printed using a Dimatix DMP-5000 Material Deposition Printer (available commercially from Fujifilm Dimatix, Inc., 2230 Martin Avenue, Santa Clara Calif. 95050, United States of America) using 16 jet piezoelectric heads (available as disposable cartridges through Dimatix). Generally 2-3 heads were used per print to improve jetting quality. The inks used were Sunjet Crystal UV curable ink in cyan (Crystal UDG U4970 Cyan Jet Ink), magenta (Crystal UDGU4896 Magenta Jet Ink), and yellow (Crystal UDG U4970 Yellow Jet Ink). A 30 μm drop spacing was used. The printed area consisted of 800 pixels in the x direction and 600 sub-pixels in the y direction, each pixel being 153>151 μm. These pixels were overprinted together in groups of 4×600 pixels, forming a series of 0.612 by 90.4 mm bars (200 bars in total, 67 each cyan and magenta bars and 66 yellow bars).

The printer was charged and calibrated with a cyan print cartridge. The backplane/double release film was placed in the printer and a fiducial mark on the backplane was found using Dimatix optics and software. The cyan bars were then printed. The printed backplane/double release film was then removed from the printer and bombarded with 20 W/inch (0.8

W/mm) of ultraviolet radiation to cure the deposited ink. The process was then repeated with magenta and yellow inks, each color being offset by 0.612 mm in the x direction.

To complete the display, a 5 mil (127 μm) PET film bearing an ITO coating on one surface was cut to the size needed for the display, and laminated to the exposed, printed adhesive layer, with the ITO-coated surface in contact with the printed adhesive layer.

Example 2

This Example illustrates a printed protective layer process of the present invention using Construction Method A above.

An encapsulated electrophoretic display was prepared by coating capsules similar to those described in Example 1 above on the ITO-coated surface of a PET/ITO film and drying, separately coating a custom polyurethane adhesive on to a release sheet, and laminating the adhesive/release sheet sub-assembly to the PET/ITO/capsule layer sub-assembly, with the adhesive contacting the capsule layer to form a front plane laminate. This front plane laminate was cut to size, the release sheet removed and the remaining layers laminated to a thin film transistor active matrix backplane to form a monochrome display. All the preceding steps were carried out substantially as described in the aforementioned U.S. Pat. No. 6,982,178.

The display thus prepared was ink jet printed using the same printer and inks as in Example 1 above. Printing was effected using the arrangement shown in FIG. 5 of the accompanying drawings, in which a single pixel is represented by the 6×6 area within the heavily lined box. As may be seen from FIG. 5, the 6×6 pixel is anisotropic, comprising a 3×4 cyan sub-pixel, a 3×4 magenta sub-pixel and a 6×2 yellow sub-pixel. This pixel is tessellated to fill the entire display, with adjacent pixels being inverted relative to one another in the vertical direction (as illustrated in FIG. 5) so that the repeating unit on the backplane, as shown in FIG. 5, was similar to the pixel unit but twice as large in each direction.

The cyan sub-pixels were printed first as a matrix of 0.918 by 1.208 mm rectangles offset by 1.836 mm in the x direction and 2.416 mm in the y direction. The display was removed from the printer and bombarded with 20 W/in (0.8 W/mm) of ultraviolet radiation to cure the printed ink. The same pattern, offset by 0.918 mm in the x direction, was printed using magenta ink, followed by another curing step. Finally a series of yellow stripes 120.8 by 0.604 mm was printed in the remaining area and cured.

The present processes provide several major advantages:
(a) the processes can be used for rapid construction of prototype color displays, even active matrix displays, since the process is well adapted for "one-off" production and no expensive masks or similar devices are required for each new type of color filter array.
(b) no expensive pre-formed color filter array is required; the array is produced on demand by printing directly on the desired layer. The cost of the resulting display is greatly reduced as a result. This saving is particularly important for larger displays.
(c) the optical performance of the display is not degraded because of multiple optical layers, as in the case of a separately constructed, laminated color filter array or overlay. Further, in many processes of the present invention intimate contact between the colorant and the imaging layer means that there is no optical degradation resulting from parallax.
(d) the construction and manufacture of the color display is simplified because the alignment and application of the colored areas is facilitated: it is easier to position the active matrix backplane using fiducial marks built into that portion of the display than to align a pre-formed color filter array with the backplane in two dimensions. This method of construction would also be more amenable to flexible backplanes, since ink jet printing allows for correction for dimensional changes of the backplane during manufacture.

Numerous changes and modifications can be made in the preferred embodiments of the present invention already described without departing from the scope of the invention. Accordingly, the foregoing description is to be construed in an illustrative and not in a limitative sense.

The invention claimed is:

1. A process for preparing a sub-assembly useful for forming a color electro-optic display, the process comprising providing a sub-assembly comprising a layer of solid electro-optic material and an adhesive layer having one surface in contact with the layer of solid electro-optic material and a second, exposed surface, and ink jet printing a plurality of colored areas on the exposed surface of the adhesive layer.

2. A process according to claim 1 wherein a plurality of first colored areas and a plurality of second colored areas are printed on said exposed surface of the adhesive layer, the first and second colored areas being of different colors.

3. A process according to claim 1 wherein the electro-optic material comprises a rotating bichromal member material or a microcell electrophoretic material.

4. A process according to claim 1 wherein the electro-optic material comprises an encapsulated electrophoretic material comprising a plurality of capsules in a binder, or a polymer-dispersed electrophoretic material.

5. A process according to claim 1 wherein the ink used is radiation curable and after the ink has been printed it is exposed to radiation effective to cure the ink.

6. A process according to claim 1 wherein the ink used comprises pigment particles in an organic solvent.

7. A process according to claim 1 wherein the layer of electro-optic material is disposed on a backplane comprising at least one pixel electrode.

8. A sub-assembly useful for forming a color electro-optic display, the sub-assembly comprising a layer of solid electro-optic material and an adhesive layer, the adhesive layer having one surface in contact with the layer of solid electro-optic material and a second, exposed surface having a plurality of colored areas printed thereon.

9. A sub-assembly according to claim 8 having a plurality of first colored areas and a plurality of second colored areas printed on said second surface of the adhesive layer, the first and second colored areas being of different colors.

10. A sub-assembly according to claim 8 wherein the electro-optic material comprises a rotating bichromal member material or a microcell electrophoretic material.

11. A sub-assembly according to claim 8 wherein the electro-optic material comprises an encapsulated electrophoretic material comprising a plurality of capsules in a binder, or a polymer-dispersed electrophoretic material.

12. A sub-assembly according to claim 8 disposed on a backplane comprising at least one pixel electrode.

* * * * *